Sept. 8, 1953 D. W. YOUNG ET AL 2,651,400
GRAPH PLOTTING MACHINE
Filed Aug. 10, 1950 6 Sheets-Sheet 1

INVENTORS.
DON W. YOUNG
JOHN B. TRENHOLM JR.
BY Wade Koontz AND
ATTORNEY
Charles L. Burgoyne
AGENT

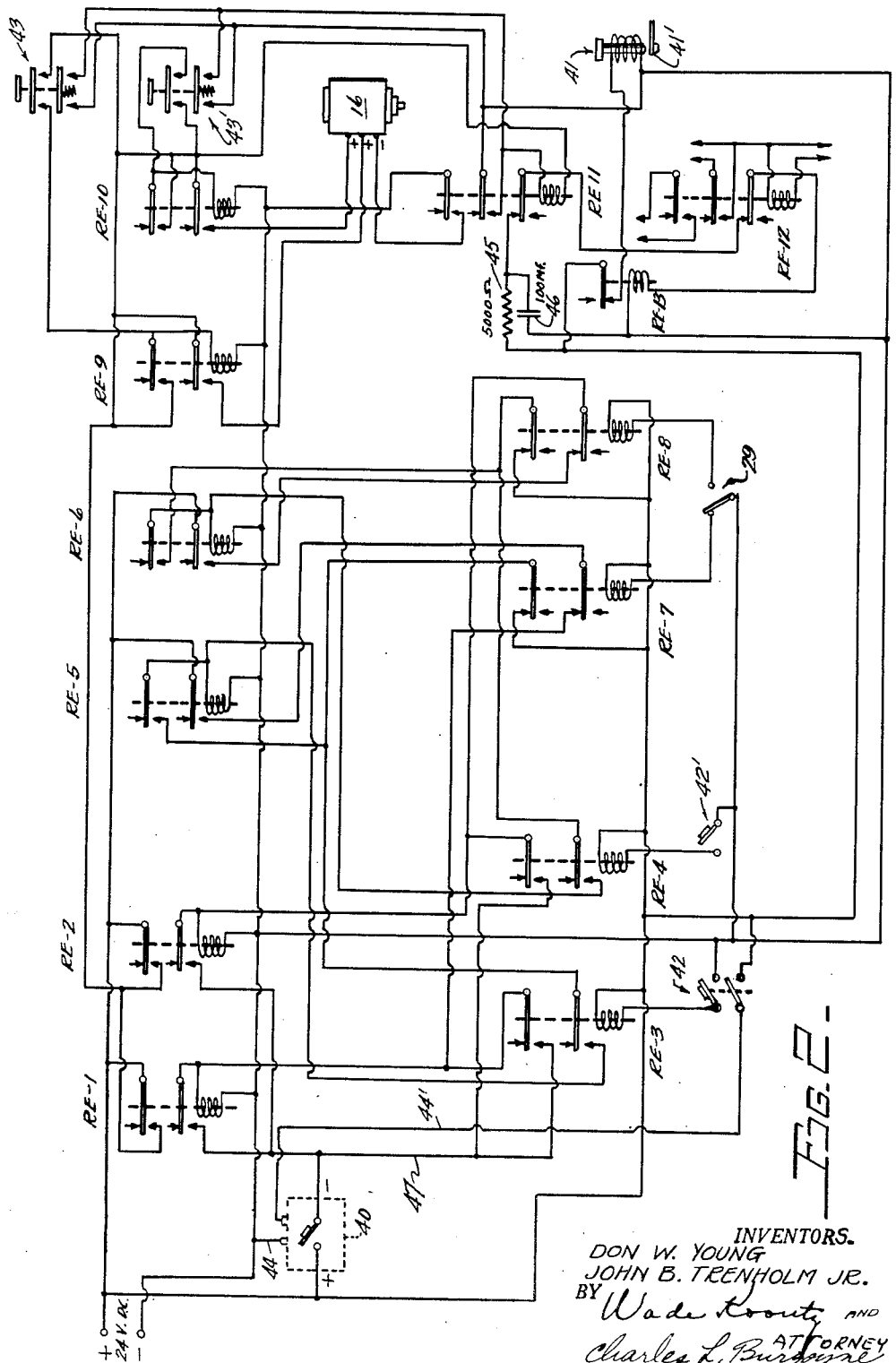

Sept. 8, 1953　　　　D. W. YOUNG ET AL　　　　2,651,400
GRAPH PLOTTING MACHINE
Filed Aug. 10, 1950　　　　　　　　　　　　　　6 Sheets-Sheet 3
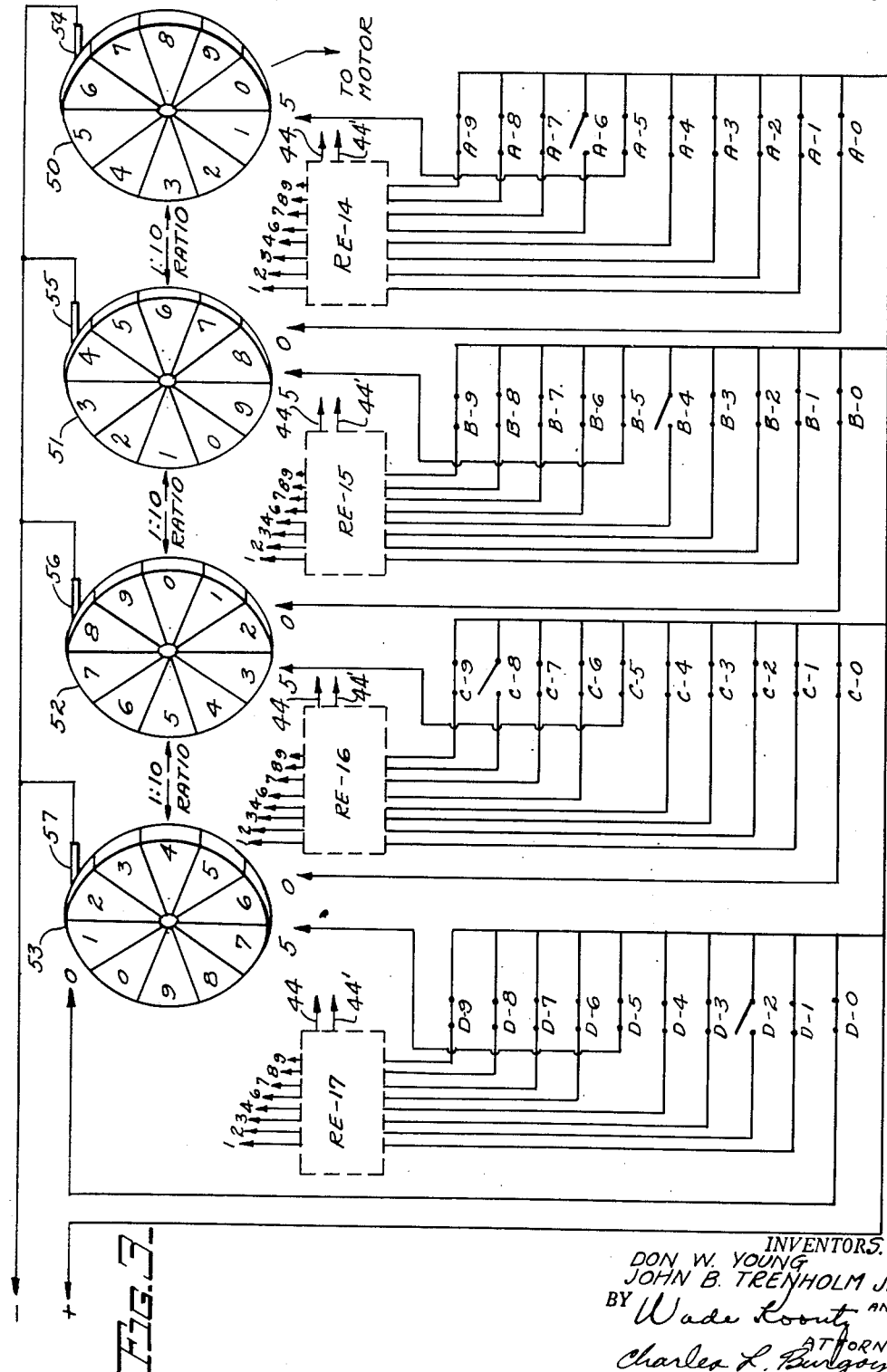
INVENTORS.
DON W. YOUNG
JOHN B. TRENHOLM JR.
BY Wade Koontz AND
ATTORNEY
Charles L. Burgoyne.
— AGENT Sept. 8, 1953 D. W. YOUNG ET AL 2,651,400
GRAPH PLOTTING MACHINE
Filed Aug. 10, 1950 6 Sheets-Sheet 4
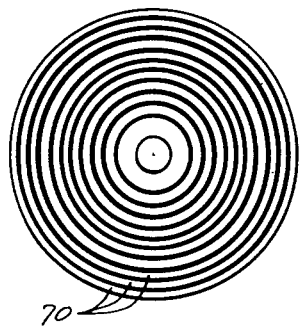
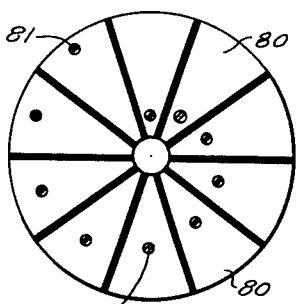
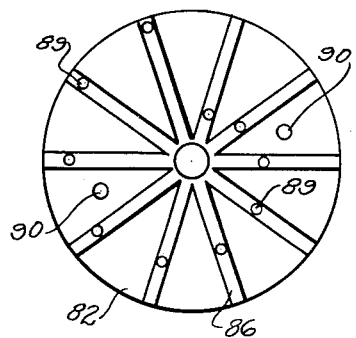
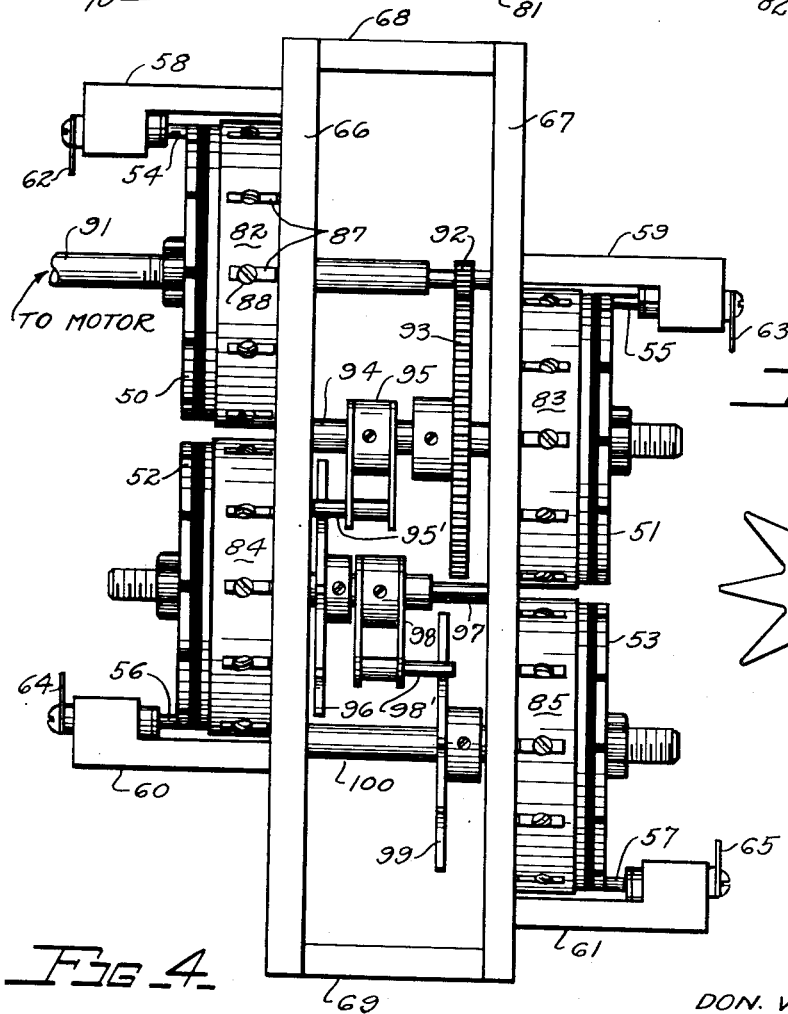
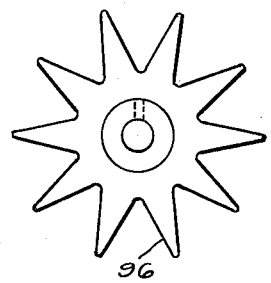
INVENTORS.
DON. W. YOUNG
JOHN B. TRENHOLM JR.

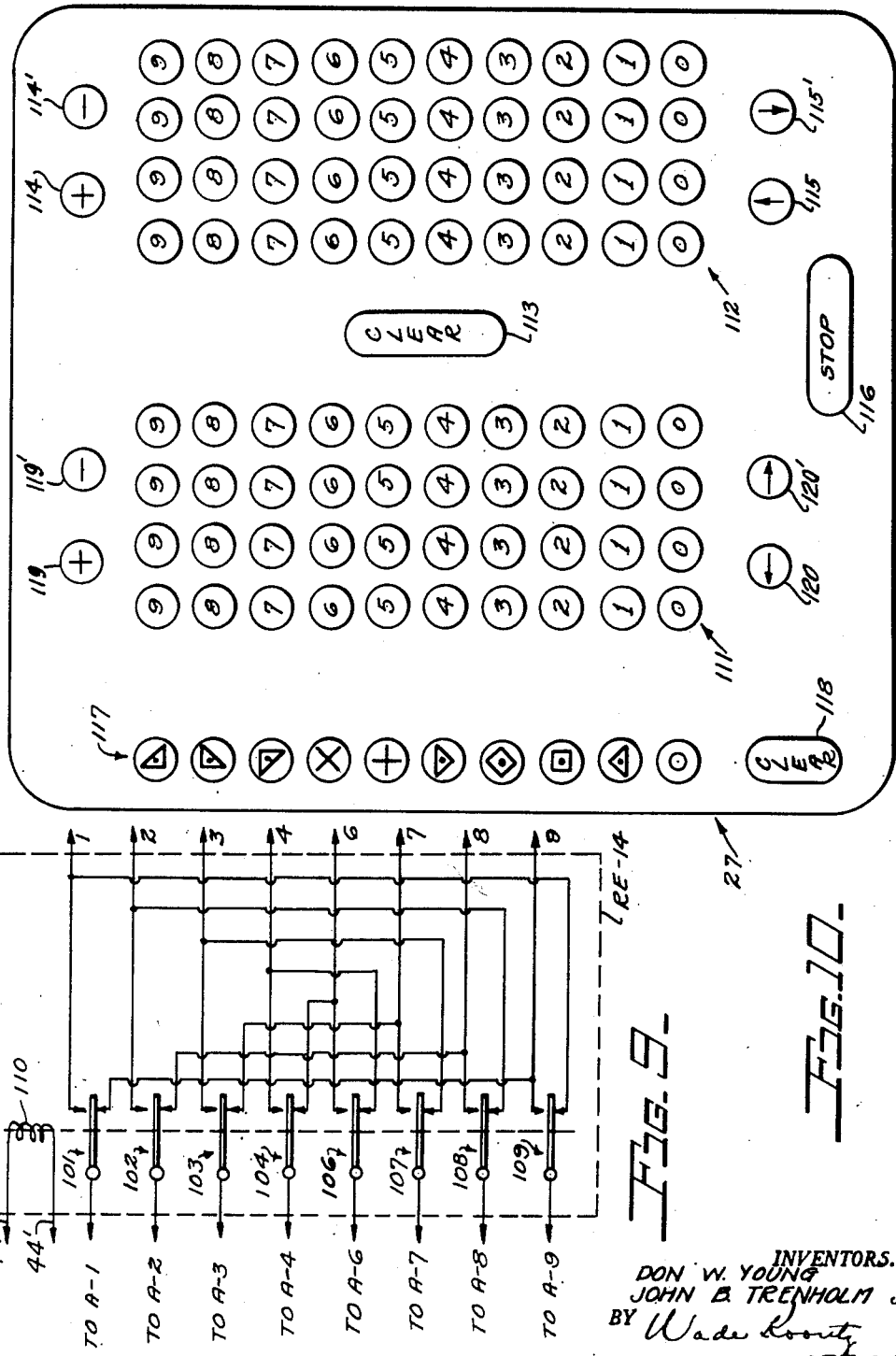

Sept. 8, 1953     D. W. YOUNG ET AL     2,651,400
GRAPH PLOTTING MACHINE
Filed Aug. 10, 1950     6 Sheets-Sheet 6
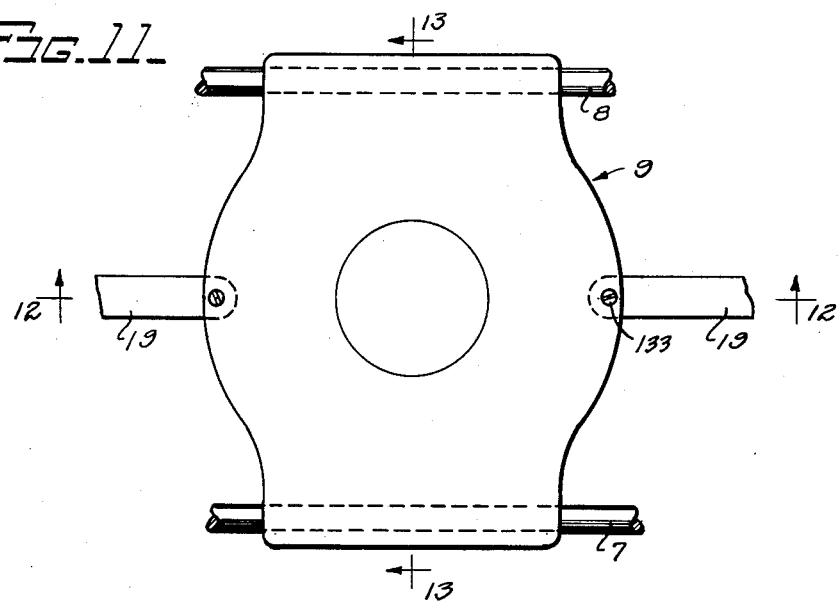
Fig. 11.
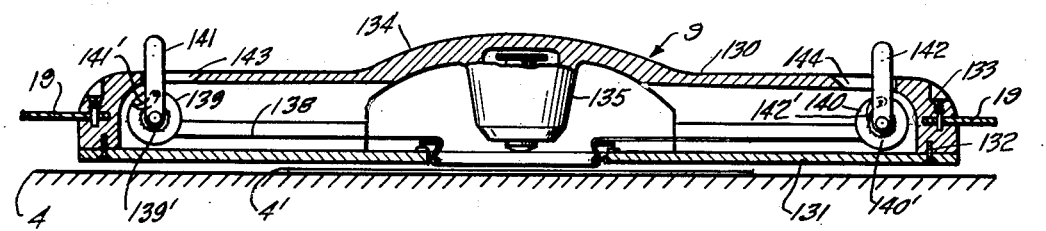
Fig. 12.
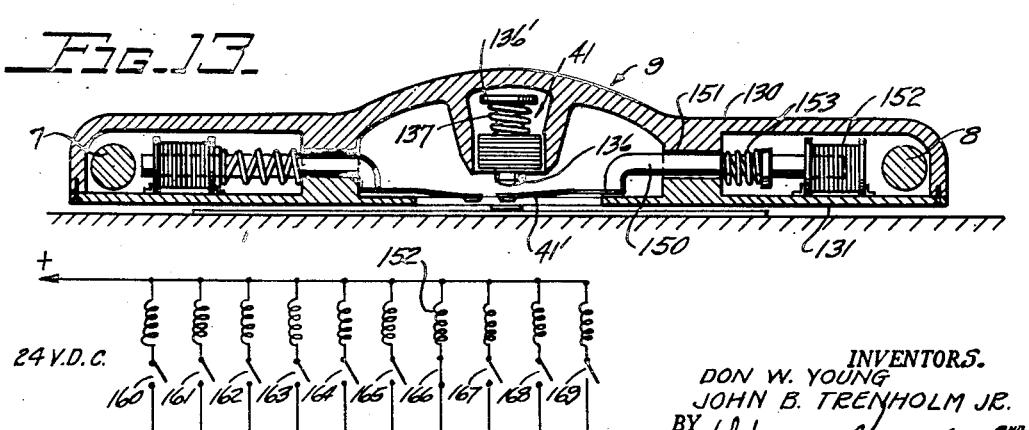
Fig. 13.
Fig. 14.
INVENTORS.
DON W. YOUNG
JOHN B. TRENHOLM JR.

Patented Sept. 8, 1953

2,651,400

UNITED STATES PATENT OFFICE 2,651,400

GRAPH PLOTTING MACHINE

Don W. Young and John B. Trenholm, Jr., Dayton, Ohio

Application August 10, 1950, Serial No. 178,712

14 Claims. (Cl. 197—2)

(Granted under Title 35, U. S. Code (1952), sec. 266)

The invention described herein may be manufactured and used by or for the United States Government for governmental purposes without payment to us of any royalty thereon.

The present invention relates to a graph plotting machine.

The primary object of the invention is to provide a machine to automatically locate and print preselected coordinate points on a graph chart in response to actuation of a series of keys representing the digits in coordinate values measured from coordinate axes extending at a right angle to each other.

A further object of the invention is to provide a machine or assembly of apparatus including a plotting board having a plotting head mounted for movement thereover in two directions at a right angle to each other and adapted for movement by means of two independent electrical motors with the motors under control of prepositioning counter devices including switching means adapted to open the motor circuits when the plotting head reaches a preselected position corresponding to preselected coordinate points on the plotting board.

Another object of the invention is to provide a graph plotting machine including a plotting board having a plotting head mounted for movement thereover in two directions at a right angle to each other and having plotting head actuating means including a pair of independent electric motors under control of prepositioning counter devices including switching means adapted to open the motor circuits when the counter devices are operated by the motors to positions corresponding to preselected coordinate points and further including a printing solenoid in the plotting head actuated by opening of both motor circuits to cause a movable type bar in the plotting head to print a symbol at a predetermined point on the plotting board.

Another object of the invention is to provide a graph plotting machine wherein a movable plotting head is actuated by two independent electric motors, and the motors are under control of two prepositioning counter devices each including a plurality of counter wheels driven at a one to ten ratio with respect to each other and each wheel including ten contact points engaged by a brush for eventually breaking a motor circuit when a predetermined contact point on each counter wheel comes into engagement with the respective wheel brushes.

Another object of the invention is to provide an automatic electrically-operated graph plotting machine under control of a keyboard unit including a multiplicity of switches corresponding to possible points on a graph chart.

The above and other objects of the invention will become apparent upon reading the following detailed description in conjunction with the drawings, in which:

Fig. 2 is a wiring diagram of that portion of the machine capable of actuating the plotting head along one axis or direction of movement.

Fig. 3 is a wiring diagram of one of two prepositioning counter mechanisms required in the machine.

Fig. 4 is an elevation view of one of the prepositioning counter mechanisms.

Fig. 5 is a plan view of one side face of a contact wheel used in the counter mechanism.

Fig. 6 is a plan view of the other side face of a contact wheel used in the counter mechanism.

Fig. 7 is a plan view of one side face of a brush supporting disk used in the counter mechanism.

Fig. 8 is a plan view of a ten tooth star wheel used in the counter mechanism.

Fig. 9 is a wiring diagram of a relay used to reverse the digit orientation of the counter wheels in the counter mechanism.

Fig. 10 is a plan view of the keyboard control unit.

Fig. 11 is a plan view of the plotting head or printing head.

Fig. 12 is a cross sectional view taken on line 12—12 of Fig. 11.

Fig. 13 is a cross sectional view taken on line 13—13 of Fig. 11.

Fig. 14 is a wiring diagram of the plotting head type bar solenoids contained in the plotting head.

*Machine assembly*

Figure 1:
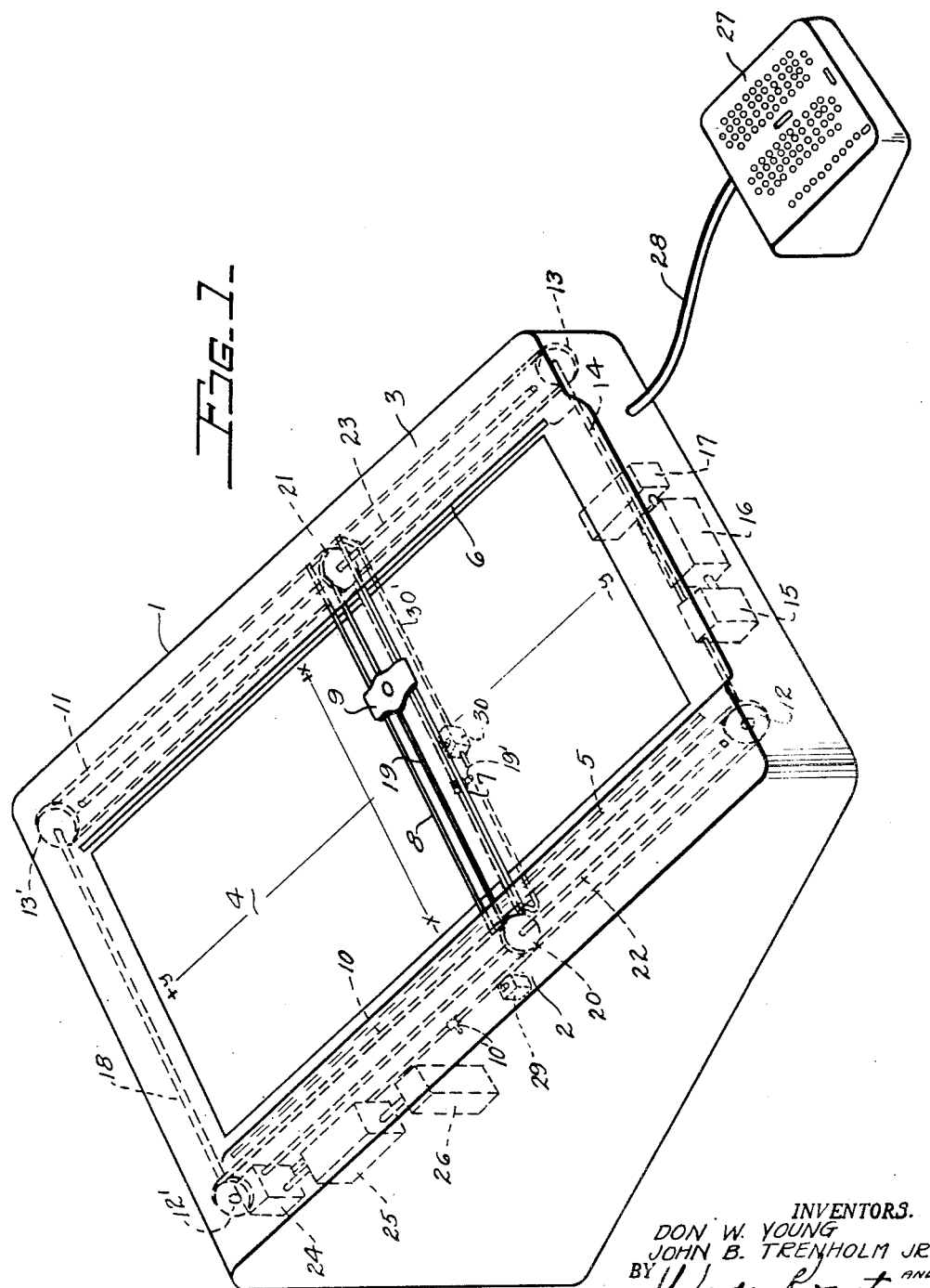
Fig. 1 is a perspective view of the present graph plotting machine including the keyboard control unit forming part of the invention.

Referring first to Fig. 1 for a description of a complete assembly of the present graph plotting machine it will be noted that the main housing 1 includes sloping top marginal wall portions 2 and 3 between which is mounted a flat plotting board 4 which is depressed below the level of wall portions 2 and 3. Facing each other at the inner edges of wall portions 2 and 3 are elongated slots 5 and 6 to allow lengthwise traverse of a pair of crosswise extending rods 7 and 8 on which is mounted a graph plotting head 9, the latter being capable of crosswise traverse on the guide rods 7 and 8. The rods are attached at either end to the longitudinal belts 10 and 11 and particularly to the upper sections thereof extending between pairs of pulleys or sprockets 12, 12' and 13, 13'. The two lower pulleys 12 and 13 are positively driven by a shaft 14 extending through a gear box 15. The gear box which is shaft coupled to an electric motor 16 serves to reduce the motor speed to give a speed of rotation at shaft 14 suitable for causing longitudinal traverse of the guide rods 7 and 8 and the plotting head 9. The motor 16 drives a prepositioning counter mechanism 17 including electrical motor control means to be described below, whereby the motor will stop when the plotting head reaches the correct longitudinal position on the plotting board 4. The upper pair of pulleys 12' and 13' are rigidly connected by a cross-shaft 18 so as to provide for equal rotational speed thereof at all times.

The plotting head 9 slidably mounted on crosswise rods 7 and 8 is caused to move transversely of the plotting board by means of a belt 19 attached to the plotting head and trained over pulleys or sprockets 20 and 21 slidably mounted on rods 22 and 23. The drive pulley 20 is non-rotatably connected to shaft 22 by suitable spline means and rotation if shaft 22 is effected by a gear box 24, motor 25 and prepositioning counter mechanism 26 similar to the components 15, 16 and 17 mentioned above. It is noted that the belts and sprockets for driving the plotting head either longitudinally or transversely of the plotting board should include interengaging means to prevent slippage between the driving sprockets and the sprocket driven belts. This expedient does not affect the principle of operation but merely maintains the desired accuracy of the plotting device.

The prepositioning counter mechanism 17 and 26 are switching devices operated by the plotting head drive motors 16 and 25 respectively to open the motor circuits when preselected positions are reached by the plotting head. This preselection is accomplished by means of a keyboard control unit 27 having mounted therein a multiplicity of switches which are all normally closed. However by opening certain of these switches which are in series with rotatable switching elements of the prepositioning counter mechanisms, the motor circuits are caused to open when these rotatable switching elements reach predetermined positions corresponding to the desired position on the plotting board 4. The arrangement of switches on the control unit 27 will be explained more fully below but it is noted that an electrical cable 28 containing numerous wires extends between the units 1 and 27. The drive belts 10 and 19 carry switch actuating projections 10' and 19' fixed on the lower sides of the belts to actuate two-positions switches 29 and 30 when the plotting head 9 moves up or down from a central position or to the right or left from a central position. The switches 29 and 30, which are single-pole double-throw switches having a toggle or snap action from one position to the other, are termed zero switches and their function will be explained below.

The machine operator will normally sit in front of the plotting board or machine unit 1 with the keyboard unit 27 accessible nearby. However it is possible to have the plotting machine unit 1 located at a distance from the keyboard unit 27, since the operation is entirely automatic after operation of the proper keys on the keyboard unit. Furthermore a plurality of graph plotting units 1 may be controlled by a single keyboard unit 27, provided the proper electrical connections are made between the switches of the keyboard unit and the electrical systems contained in the plotting machine units.

It is noted that the gear ratios through the gear boxes 15 and 24 will determine the relative distance traveled by the plotting head for each unit as represented on the keyboard. This relative value of the distance between successive coordinate points is termed the scale of the graph and by proper selection of the gear ratios in the two gear boxes the scale may be varied accordingly. Thus if the gear reduction from motor to drive sprocket is large, then the scale of the coordinate axis will be small and vice versa. In order to facilitate changes in the gear ratios and in the coordinate scales, the gear boxes may include change gears or any well-known type of variable ratio gearing or transmission means. Another feature of adjustability of the assembly which should be noted is that of adjustment of the point of origin of the graph. Since the only structural feature which determines the relative location of the $x$ and $y$ axes is the position of the plotting head when the projections 10' and 19' actuate the switches 29 and 30, the relative position of the origin may be varied by shifting the switch actuating projections on the lower pass of the belts 10 and 19. As an alternative it is also possible to shift the positions of the zero switches 29 and 30 to determine new zero positions for the graph axes. The zero switch 30 is mounted on a transverse rod 30' rigidly connected at its ends to the guide rod 7 and extending horizontally under the plotting board 4.

*Machine control system and circuit*

Before proceeding to a description of the control components in each of the two main control systems for causing movement of the plotting head 9 in longitudinal and transverse directions respectively, it will be pointed out just how circuits are completed to start the motors 16 and 25 and how these circuits are interrupted to cause the plotting head to stop at a predetermined coordinate point and print a mark or symbol. Insofar as possible these facts will be outlined by reference to Fig. 2 wherein an electrical system is illustrated for controlling the position of the plotting head in one direction of movement, let us say longitudinally or from the lower end to the upper end of the plotting board 4, or vice versa. Thus the electrical circuit of Fig. 2 will be considered as controlling only the motor 16 and connected drive shaft 14. The circuit for the other motor 25 will be exactly the same as in Fig. 2. The two separate circuits, only one of which is illustrated, will be known as the longitudinal control circuit and the transverse control circuit. What each of these circuits accomplishes is to (1) start a motor when appropriate keys are operated on the keyboard unit 27; (2) maintain the motor in operation until a position of the plotting head is reached corresponding to the keyboard actuation; (3) break the power circuit to the motor when the plotting head reaches the desired position; and (4) after a momentary delay cause a printing solenoid in the plotting head to be actuated to press a type element onto an inked ribbon superimposed over a chart surface and directly under the type element. Functions (2) and (3) are effected by a motor driven prepositioning counter mechanism, which is one of the most important parts of the two control systems and which is indicated at 40 in Fig. 2. It is represented as a switch in Fig. 2, since its function is to close a motor starting circuit and also to open the circuit when the motor has moved the plotting head to a position where the switch will open to stop the motor. Thus the component 40 may be considered a motor driven switch which will open when the motor has operated the switch to a predetermined extent or condition. Since this motor driven switching means is wired into a control circuit including manual switches inside the keyboard unit 27, the extent of motor operation is determined by the preselection of certain manual switches which are opened to cause an interruption of the motor control circuit when the motor driven switching means 40 reaches a condition in which contact elements in series with the certain manual switches simultaneously engage brushes in the motor drive control circuit.

The circuit of Fig. 2 includes a number of relays all shown in the normal or non-energized condition, except for relay RE-13 which closes the circuit to the printing solenoid 41. A pair of alternatively selectable switches 42 and 42' are known as sign switches. A pair of push button switches 43 and 43' are known as direction switches and the two position switch 29 previously mentioned is called a zero switch. The control circuit includes provision for selecting points in any one of four quadrants of a standard graph sheet where the two plotting axes intersect at the center of the plotting sheet and plotting board 4. Thus the complete machine is versatile enough to plot any conceivable curve based on two variables, such as $x$ and $y$. The circuit of Fig. 2 will handle all variations in $y$ values and another similar circuit including components 25, 26 and 30 will handle all variations in $x$ values. Two lines 44 and 44' extend from the switch means 40 and provide for actuation of a special relay included as part of the switch means to be explained below. A resistor 45 and condenser 46 having indicated values in keeping with the chosen line voltage (24 volts D. C.), are required in the printing circuit to provide a delayed impulse occurring after the motor 16 has come to a dead stop.

To show how the circuit of Fig. 2 functions one example or sequence will be traced through the various switches and relays. Assuming first that the switch means 40 is closed when the power circuit is turned on, as it will be unless the plotting head is already on the exact spot desired, the positive potential will be applied through the switch 40 to the line 47. It is also assumed that the plotting head is above the $x$—$x$ axis to begin with and that the point to be plotted is below the $x$—$x$ axis, that is a negative value of $y$. The zero switch 29 is now to the left in Fig. 2 to correspond with the positive value of $y$ on starting. Since the point to be plotted has a negative $y$ value, the sign switch 42' is closed by manual action. This circuit now energizes the holding coil of relay RE-4, with the result that the upper contactor of the relay RE-4 closes a power circuit to the holding coil of relay RE-2, and the lower contactor of the relay RE-4 closes a power circuit through the upper contactor of RE-3 to the holding coil of relay RE-6. The relay RE-2 having been closed, the upper contactor thereof connects the positive power potential to the switch 43', and the lower contactor closes a relay lock-in circuit to the holding coil. The relay RE-6 having been closed, the upper contactor thereof closes a relay lock-in circuit to the relay holding coil by way of the upper contactor of relay RE-8, and the lower contactor closes a second lock-in circuit to the holding coil of relay RE-2 by way of the lower contactor of relay RE-8. The push button switch 43' is now closed manually, since it is indicated for downward travel of the plotting head, that is a value of $y$ more negative than the starting point. The upper contactor of the switch 43' now closes a power circuit to the holding coil of relay RE-10, while the lower contactor closes a power circuit to the holding coil of relay RE-11. The relay RE-10 having been closed, the upper contactor closes a lock-in circuit to the holding coil of the relay, and the lower contactor closes a positive power line to the motor 16. The relay RE-11 having been closed, the uppermost contactor thereof closes a negative power line to the motor 16, the intermediate contactor closes a lock-in circuit to the holding coil of the relay, and the lowermost contactor opens a short circuit across the condenser 46, so that the condenser may now charge up by way of the resistor 45. The motor 16 having been started, the sprocket 12 operates to move the plotting head downwardly along the plotting board toward the $x$—$x$ axis.

The next change in the circuit conditions will occur when the rotating contact devices in the motor driven switching means 40 reach a position corresponding to ten minus the number which was set up on the keyboard 27, assuming for simplicity that the graph plotting machine can only plot numbers from zero to ten and from zero to minus ten. Now the switching means 40 will open and current will stop flowing through the upper contactor of relay RE-4. However the relay RE-2 will stay in the locked-in condition by reason of a circuit through the lower contactors of relays RE-6 and RE-8 to the holding coil of relay RE-2. The motor 16 will thus continue to run while the switching means 40 will pass the dead point and again close.

The next change in the circuit conditions will occur when the plotting head reaches the $x$—$x$ axis or in other words when the value of $y$ is zero. At this point the zero switch 29 will be actuated to the negative position or to the right in Fig. 2. Because of this action relay RE-7 is deenergized and relay RE-8 is energized. The upper contactor of relay RE-8 being pulled down, the power circuit to the holding coil of relay RE-6 is broken. The lower contactor of relay RE-8 being pulled down, the circuit through the lower contactor of relay RE-6 is broken, whereby the positive power line is no longer connected to line 47 through relays RE-2 and RE-4.

On arrival of the plotting head at the correct negative value of $y$ below the $x$—$x$ axis the switching means 40 will reach an open circuit condition. The holding coil circuit of relay RE-2 will be broken, so that this relay will open. Now the holding coil circuits of relays RE-10 and RE-11 are broken and both relays open, thus stopping the motor. The relay RE-12 is an exact counterpart of relay RE-11 but is wired into the control circuit for the other motor 25. It will be seen that both of relays RE-11 and RE-12 must be deenergized (as shown) to connect the charged condenser across the holding coil of relay RE-13, the lowermost contactors of relays RE-11 and RE-12 being connected in series with condenser 46 and the holding coil of relay RE-13. Closing of relay RE-13 (as shown) connects the printing solenoid 41 across the 24 volt potential source so that the movable core therein makes a downward stroke to cause a type element 41' to be pressed against an inked ribbon and thus make a mark on the graph chart. The charged condenser discharges almost instantly through the holding coil of relay RE-13, so that the relay opens very quickly and the printing solenoid is thus disconnected from the potential source. It should be noted further that the two relays RE-11 and RE-12 will not be deenergized until the respective drive motors 16 and 25 have completed their functions in moving the plotting head longitudinally and transversely of the plotting board. Then the motor control circuits and relays thereof will recycle by breaking of the circuits through the respective prepositioning counter devices.

To complete the nomenclature of the system it is noted that relays RE-1 and RE-2 are termed sign relays, relays RE-3 and RE-4 are termed sign switch relays, and relays RE-5 and RE-6 are termed holding relays. The relays RE-7 and RE-8 are termed zero switch relays, because they are alternatively energized by the two-position zero switch 29. The relays RE-9 and RE-10 are termed direction relays, and relays RE-11 and RE-12 are termed motor holding relays since they are essential in connecting the motors 16 and 25 to the power source and maintaining the connections.

A further description of certain system components and their operation will be found below but the above example of one possible operating sequence will serve to show the circuit function in relation to the motor 16 and the printing mechanism. The motor 16 has two + terminals and when the positive potential is connected to one of the + terminals the motor drives in one direction, while connection of the positive potential to the other causes the motor to run in the other direction.

*Prepositioning counter mechanism*

Considering now the prepositioning counter mechanism in one possible embodiment thereof, reference is made to Figs. 3 to 9 of the drawings. The principle involved in a device of this kind is the provision of a rotatable counting mechanism which has a zero position when the movable plotting head is at a zero position, whereby both the counting mechanism and the plotting head may be driven at the same time by a motor whose circuit is controlled by the counter mechanism and which is so geared to the counter mechanism and the plotting head as to provide plotting head movements in direct proportion to the numerical quantities totaled at any time on the counter mechanism.

The four wheel counter mechanism illustrated makes possible the representation of a four-digit number, such as 2.846 or 2846. This is the setting for the counter mechanism switches as depicted in Fig. 3. The four counter disks or wheels 50, 51, 52 and 53 are schematically represented in Fig. 3 but reference to Figs. 4 to 6 will show their actual structure. Each disk has a segmentally divided side (Fig. 6) contacted by a brush 54, 55, 56 or 57 and a circularly divided side (Fig. 5) contacted by a separate brush for each ring portion. Each of the brushes 54 to 57 is slidably supported in a bracket 58, 59, 60 or 61 and circuits to the spring projected brushes are completed through soldering lugs 62, 63, 64 or 65. The brush supports and wheel shafts are supported in a rectangular box-like frame including side plates 66 and 67 and end plates 68 and 69 suitably connected in rigid relation. Noting Fig. 5 again it will be seen that there are ten slip rings, as at 70, each of different diameter and separated by insulation. The segments 80 on the other side of the disks are separately joined to the slip rings by screws 81, so that the separate metallic elements are maintained in assembled relation and so that each slip ring 70 is electrically connected to a separate segment 80. Contiguous to each disk or wheel 50 to 53 is a circular terminal block 82, 83, 84 or 85 of insulating material, with each block rigidly connected to a side plate 66 or 67. The block 82 of Fig. 7 for example has one side face radially grooved, as at 86, to receive connector strips 87 having right-angular portions at the outer ends secured to the block by screws 88. As is seen in Fig. 4 the grooved side of each block is against the side plates but the metal connector strips 87 are out of contact with relation to the side plates of the frame. At radial distances corresponding to the radii of the slip rings 70 the block 82 is pierced, as at 89, to receive compression springs and brushes in series so that a brush bears on each slip ring and a corresponding spring presses on each connector strip 87, to make continuous connection from respective segments 80 to corresponding terminal or connector strips 87. The pair of apertures 90 in the block 82 receive screws extending through the blocks and threaded into the side plates 66 and 67.

The counter wheel 50 rigidly mounted on the motor driven shaft 91 represents the last digit in the four digit number above mentioned and this shaft carries a pinion 92 adapted to drive the gear wheel 93 mounted on shaft 94, so as to provide a ten to one speed ratio between shafts 91 and 94 and between counter wheels 50 and 51. Rigidly mounted on the shaft 94 is a pin-carrying member 95 having a laterally projecting drive pin 95' thereon which acts to rotate a star wheel 96 through one-tenth revolution for each revolution of shaft 94. The star wheel 96, having ten points thereon, is rigidly mounted on a shaft 97 which also carries counter wheel 52. Another pin-carrying member 98 on the shaft 97 carries a drive pin 98' engageable with another star wheel 99 rigid with respect to shaft 100 having a fourth counter wheel 53 secured thereto. The respective shafts 91, 94, 97 and 100 rotate freely in the fixed terminal blocks 82 to 85, since as seen in Fig. 7 each block has a central passage therethrough. The counter wheels 50 to 53 rotate simultaneously with successive ten to one speed reduction. Each wheel represents a digit in a four digit number, wheel 50 representing the fourth digit, wheel 51 representing the third digit, wheel 52 representing the second digit and wheel 53 representing the first digit. Thus the highest speed wheel 50 representing units in a four digit number will rotate through sufficient revolutions during a particular driving sequence to total the units required to complete the change from one point to another point on a graph sheet. While this wheel is going through a great many revolutions the other wheels will go through fewer revolutions until the right combination comes up on all four wheels, whereupon an open circuit condition will occur and the motor control circuit will cut off power to the motor. The circuit opening combination will depend on the preselection and opening of switches on the keyboard unit 27 corresponding to the number to be plotted and also the selection of switches determining the sign of the number and the direction of plotting head movement required to effect the new position desired.

Having described the mechanical arrangement of one possible type of prepositioning counter or switching mechanism, the electrical circuit thereof will now be described by reference to Figs. 3 and 9. The counter wheels 50 to 53 each include ten segments numbered from 0 to 9 (see Fig. 3) and each segment is connected in series with a switch designated from A-0 to D-9. As in Fig. 4 the brushes 54 to 57 contact only a single segment on the respective wheels at any one time, and a circuit is completed from the + terminal to the − terminal until all four wheels reach positions corresponding to open circuit condition as determined by the open switches, such as A-6, B-4, C-8 and D-2. The complete circuit of Fig. 3 is substituted for the simple switch component 40 of Fig. 2. Also in Fig. 3 the relay units RE-14 to RE-17 are each comprised of an eight contact two-position relay as shown in Fig. 9. These relays are actuated from one position to the other by closing of the sign switch 42 (Fig. 2), the lines 44 and 44' of Fig. 2 being also designated in Figs. 3 and 9. It is noted that the lines connecting segments 0 and 5 of the counter wheels and their corresponding switches bypass the relays RE-14 to RE-17, since because of the position of these segments in the 0 to 9 sequence reversal of rotation does not affect these circuits. It will be understood that the four sets of lines marked 0 to 9 in Fig. 3 and extending in close proximity to the four counter wheels are in continuous electrical connection with the corresponding segments of the wheels by reason of the construction of the counter mechanism. Thus in Fig. 4 the screws 88 on the metal strips 87 serve as means to tie in these conductors, marked 0 to 9 in Fig. 3, to the counter wheels.

The relays RE-14 to RE-17 are alike and are exemplified by illustration of RE-14 in Fig. 9. The relay RE-14 comprises eight two-position sections designated 101, 102, 103, 104, 106, 107, 108 and 109 all actuated in unison by a holding coil 110. If the non-energized condition of relay RE-14 the switches A-1, A-2, A-3, A-4, A-6, A-7, A-8 and A-9 will be connected to the segments 1, 2, 3, 4, 6, 7, 8 and 9 of counter wheel 50 but upon energization of the relay holding coil 110, as occurs by actuation of switch 42, the relay contactors of relay RE-14 will close on the upper contacts thus connecting switches A-1, A-2, A-3, A-4, A-6, A-7, A-8 and A-9 to segments 9, 8, 7, 6, 4, 3, 2 and 1 respectively of counter wheel 50. This provides a segment arrangement in each counter wheel which may be considered a mirror image of the arrangement as shown in Fig. 3. The 0 segment need not reverse since it is always at the beginning of the sequence of digits, while the 5 segment need not reverse since it is always at the midpoint in the sequence no matter which direction of rotation is considered. It is of course obvious that the relays RE-14 to RE-17 might be in the form of a single larger relay having thirty-two movable contactors, since the relays RE-14 to RE-17 always operate in unison because each holding coil thereof is connected to conductors 44 and 44'.

*Keyboard control unit*

The keyboard unit 27 (see Fig. 10) includes two main banks or groups of keys 111 and 112 each having forty keys numbered as shown. The right-hand bank 112 may be for determining longitudinal values or displacements from the x—x axis and the left-hand bank 111 may be for determining transverse or crosswise values or displacements from the y—y axis. Thus the keys of the right-hand bank 112 will serve when depressed to open the switches A-0 to D-9 of Fig. 3. As usual in calculating machines any key in any vertical row is released automatically by depressing another key in the same row. Thus after one point on the graph chart has been plotted a new set of values may be selected by pressing down the appropriate keys and these new keys will remain depressed while the formerly depressed keys will return to the elevated condition. This is an old expedient in calculating machines and is not essential to an understanding of the invention. Considering key bank 112 the first, second, third and fourth vertical rows or columns of keys serve to open switches D-0 to D-9, C-0 to C-9, B-0 to B-9 and A-0 to A-9 respectively. The "Clear" key 113 may be depressed at any time to cause release of all keys in the key banks 111 and 112. The mechanical arrangement making possible this clearing action is so well-known as to make illustration thereof unnecessary. The keys 114 and 114' above the key bank 112 are for actuating the sign switches 42 and 42' of Fig. 2 to closing position. These switches being alternatively selectable, means may be provided to release one switch when the other is actuated to closed position. The keys 115 and 115' below key bank 112 form push buttons for momentarily depressing and closing the direction switches 43 and 43' of Fig. 2. The key bank 111 and the sign keys and direction keys adjacent thereto are similar in every respect to their counterparts to the right of the clear key 113 but these keys control only the transverse or crosswise control system including electric motor 26. The "Stop" key 116 is for the purpose of opening a line switch to stop the whole machine at any time by breaking the power circuit thereto.

At the left-hand edge of the keyboard unit 27 is a vertical row of keys 117 marked with symbols corresponding to those on ten type elements in the plotting head 9. These keys are selectable one at a time to close appropriate circuits (Fig. 14) and cause a corresponding type element to be positioned for actuation by the printing solenoid 41 (see Fig. 2). A clear key 118 below these type keys may be depressed at any time to return a previously depressed type key to the elevated position, or in other words to clear the type key column 117. The left-hand key bank 111 for determining transverse plotting head movement is used in conjunction with the sign switch keys 119 and 119' above the key bank and the direction switch keys 120 and 120' below the key bank. The preferred shape and general proportions of the keyboard unit 27 is best shown in Fig. 1.

*Plotting head construction*

Referring now to Figs. 11 to 14 the plotting head or printing head 9 includes an upper or body portion 130 hollowed out on the underside and covered except for a central opening by a cover portion 131 secured to body portion 130 by means of screws 132. The actuating tape or belt 19 to move the plotting head transversely across the plotting board 4 is secured in recesses in opposite sides of the head 9 and is retained in these recesses by screws 133, as shown. Near the upper and lower edges the plotting head has circular passages therethrough to receive the guide rods 7 and 8 to thus guide the transverse movement of the plotting head and carry the plotting head longitudinally of the plotting board upon actuation of the belts 10 and 11.

The body portion 130 of the plotting head is centrally bulged as at 134 and this central portion carries a downwardly projecting housing element 135 having the printing solenoid 41 secured therein. Reciprocably mounted in the solenoid coil is a core 136 having a head portion 136'. Between the coil of the solenoid and the head portion 136' is a compression spring 137 adapted to return the core to the elevated position shown when the circuit to the solenoid is broken. As previously explained in conjunction with Fig. 2 the solenoid core makes only a single stroke each time the plotting head reaches a new preselected position and the circuit through both prepositioning counter devices is broken to return the relays RE-11 and RE-12 to the non-energized positions shown in Fig. 2. Extending across the plotting head on the axis passing through the belt 19 is an inked ribbon 138, which is wound on two small spools 139 and 140. The pivotally mounted spools have the ratchet wheels 139' and 140' rigidly mounted thereon and rotatably mounted on the spool pivots are levers 141 and 142 which carry ratchet engaging pawls 141' and 142'. At all times one pawl or the other is turned to the ratchet engaging position (note pawl 142'), while the other pawl is turned to the non-engaging position (note pawl 141'). Thus the lever carrying the ratchet engaging pawl may be moved periodically through a double stroke to move the ribbon 138 along a short distance for making wear on the ribbon more uniform. When the ribbon is wound onto one spool as far as possible, the pawls may be reversed by inserting a thin screw driver or nail through the slots 143 and 144 and turning the pawls to the reverse condition. Now the ribbon 138 may be wound back slowly by an occasional stroke of the active lever 141 or 142. The ribbon 138 passes from the spools to ribbon guides at the central opening in the cover portion 131, whereby the central portion of the ribbon between the two spools is maintained near to but spaced from the graph sheet 4' secured on the plotting board 4.

Mounted in radial relation within the plotting head 9 is a plurality of slidably mounted type elements each carried on a solenoid core element and projectable to an active or typing position by closing of a switch to actuate the appropriate solenoid. Considering Fig. 13 one type element 41' comprises a thin metal strip having a piece of type mounted on its free end and adapted to imprint one of the ten symbols seen in key column 117 of Fig. 10. The elongated type element 41' is rigidly mounted on a turned-over end portion of a solenoid core 150. The core is guided for its sliding movement in a passage 151 in the plotting head and in a central passage in the solenoid coil 152. A coil spring 153 around the core or plunger 150 is arranged to cause retraction of the core when the circuit to coil 152 is broken. In accordance with the provision of ten possible curve plotting symbols on the keyboard unit 27, there will be a like number of type elements and solenoid means in the plotting head although only two appear in Fig. 13. The keys in key column 117 each actuate one of the switches 160 to 169 in the solenoid circuit of Fig. 14 but only a single switch is closed at any one time. The type projecting solenoids as indicated at 152 are actuated one at a time by manual closing of the switches 160 to 169 to move one type element out to a position just below the solenoid core 136. Thus one particular type element is placed in active position while a particular curve is being plotted on the graph sheet and when another curve of related data is to be plotted on the same sheet another type element carrying its own distinguishing symbol is placed in active position by closing the appropriate switch in the circuit of Fig. 14. The circuit of Fig. 14 is an auxiliary circuit in addition to those previously described. The connecting wires necessary to carry electrical impulses to the printing solenoid 41 and to the type actuating solenoids may be brought into the plotting head 9 in any convenient manner, as for instance by using a multiconductor flexible cable extending from one side edge of the machine assembly 1 to the plotting head. It should be understood that the control system and circuit may operate on power of varying voltage, depending on the selection of components and actuating devices.

In assembling and adjusting the graph plotting machine care must be taken to place all the prepositioning counter wheels in the zero position at the same time the plotting head 9 is exactly on the origin of the graph sheet, that is at the intersection of the $x$ and $y$ axes. The rotary switch means comprising the counter disks 50 to 53 of the prepositioning counter mechanisms 17 and 26 provide what may be termed commutator devices or commutator-type switching means, because of the structural resemblance to commutators as used on electrical motors and generators. It is to be understood that various kinds of reversible servomotors may be substituted for the reversible electric motors 16 and 25 as desired. Furthermore in order to effect quick stops for the electric motors 16 and 25 and prevent any substantial overtravel thereof, these motors may be provided with electromagnetic clutch devices as disclosed in the patent to Lear and Ryberg, No. 2,267,114 granted on December 23, 1941.

The embodiments of the invention herein shown and described are to be regarded as illustrative only and it is to be understood that the invention is susceptible of variations, modifications and changes within the scope of the appended claims.

We claim:
1. A graph plotting machine comprising, means providing a plotting board and support therefor, a plotting head, means supporting said plotting head for movement transversely and longitudinally of said plotting board, independently operable means for moving said plotting head in transverse and longitudinal direction with respect to said plotting board including a pair of independently actuatable power driven devices, individual electric control circuits for said pair of power driven devices including separate rotary switch means operable by the respective power driven devices, means to maintain said power driven devices in driving operation with respect to said plotting head moving means until each of said rotary switch means has been rotated a predetermined extent, and means including manual switches in series with said rotary switch means to break said electric control circuits when said rotary switch means have been rotated a predetermined extent corresponding to an open circuit condition through said manual switches and when said plotting head has been moved to a predetermined position on said plotting board.

2. A graph plotting machine comprising, means providing a plotting board and support therefor, a plotting head, means supporting said plotting head for movement transversely and longitudinally of said plotting board, independently operable means for moving said plotting head in transverse and longitudinal directions with respect to said plotting board including a pair of independently actuable power driven devices, individual electric control circuits for said pair of power driven devices including separate commutator devices operable by the respective power driven devices, means to maintain said power driven devices in driving operation with respect to said plotting head moving means until each of said commutator devices has been rotated a predetermined extent, and means including manual switches each in series with a segment of said commutator devices to break said electric control circuits when said commutator devices have been rotated a predetermined extent corresponding to an open circuit condition through said manual switches and when said plotting head has been moved to a predetermined position on said plotting board.

3. A graph plotting machine comprising, means providing a plotting board and support therefor, a plotting head, means supporting said plotting head for movement transversely and longitudinally of said plotting board, independently operable means for moving said plotting head in transverse and longitudinal directions with respect to said plotting board including a pair of reversible electric motors, individual control circuits for said pair of motors including separate rotary switch means operable by the respective motors, means to maintain said motors in operation until each of said rotary switch means has been rotated a predetermined extent, and means including manual switches in series with said rotary switch means to break said motor control circuits when said rotary switch means have been rotated a predetermined extent corresponding to an open circuit condition through said manual switches and when said plotting head has been moved to a predetermined position on said plotting board.

4. A graph plotting machine comprising, means providing a plotting board and support therefor, a plotting head, means supporting said plotting head for movement transversely and longitudinally of said plotting board, independently operable means for moving said plotting head in transverse and longitudinal directions with respect to said plotting board including a pair of reversible electric motors, individual control circuits for said pair of motors including separate commutator devices operable by the respective motors, means to maintain said motors in operation until each of said commutator devices has been rotated a predetermined extent, and means including manual switches each in series with a segment of said commutator devices to break said motor control circuits when said commutator devices have been rotated a predetermined extent corresponding to an open circuit condition through said manual switches and when said plotting head has been moved to a predetermined position on said plotting board.

5. A graph plotting machine comprising, means providing a plotting board and support therefor, a splotting head, means supporting said plotting head for movement transversely and longitudinally of said plotting board, independently operable means for moving said plotting head in transverse and longitudinal directions with respect to said plotting board including a pair of independently actuable power driven devices, individual electric control circuits for said pair of power driven devices including separate rotary switch means operable by the respective power driven devices, means to maintain said power driven devices in driving operation with respect to said plotting head moving means until each of said rotary switch means has been rotated a predetermined extent, means including manual switches in series with said rotary switch means to break said electric control circuits when said rotary switch means have been rotated a predetermined extent corresponding to an open circuit condition through said manual switches and when said plotting head has been moved to a predetermined position on said plotting board, and means responsive to breaking of said control circuits simultaneously for printing a symbol on said plotting board at said predetermined position of said plotting head on said plotting board.

6. A graph plotting machine comprising, means providing a plotting board and support therefor, a plotting head, means supporting said plotting head for movement transversely and longitudinally of said plotting board, independently operable means for moving said plotting head in transverse and longitudinal directions with respect to said plotting board including a pair of independently actuable power driven devices, individual electric control circuits for said pair of power driven devices including separate rotary switch means operable by the respective power driven devices, means to maintain said power driven devices in driving operation with respect to said plotting head moving means until each of said rotary switch means has been rotated a predetermined extent, means including manual switches in series with said rotary switch means to break said electric control circuits when said rotary switch means have been rotated a predetermined extent corresponding to an open circuit condition through said manual switches and when said plotting head has been moved to a predetermined position on said plotting board, means movably mounted on said plotting head to print a symbol on said plotting board, and means including a solenoid responsive to breaking of said control circuits simultaneously for actuating said movably mounted means.

7. A graph plotting machine comprising, means providing a plotting board and support therefor, a plotting head, means supporting said plotting head for movement transversely and longitudinally of said plotting board, independently operable means for moving said plotting head in transverse and longitudinal directions with respect to said plotting board including a pair of independently actuable power driven devices, individual electric control circuits for said pair of power driven devices including separate commutator-type switching means operable by the respective power driven devices, each of said switching means including a plurality of conductive segmented rotary elements contacted by separate conductive brushes, means connecting said plurality of rotary elements and the respective brushes thereof in parallel, a manual switch in series with each segment of each rotary element and movable selectively to open position to cause an open circuit condition through the switching means when predetermined ones of said segments are contacted by the associated brushes, and means to cause rotation of the rotary elements of each switching means at a predetermined speed ratio with respect to each other, whereby a predetermined degree of rotation of the rotary elements of each switching means occurs concurrently with a predetermined traverse of said plotting head transversely and longitudinally of said plotting board before the open circuit condition of each switching means occurs and said electric control circuits are broken to cause said power driven devices to be deenergized with respect to said plotting head moving means and said commutator-type switching means.

8. A graph plotting machine as recited in claim 7, wherein each of said rotary elements of said switching means includes only ten equally spaced conductive segments, and wherein the means to cause rotation of the rotary elements of each switching means at a predetermined speed ratio with respect to each other comprises gearing between successive rotary elements to provide a ten to one speed ratio from driving to driven element.

9. A graph plotting machine comprising, means providing a plotting board and support therefor, a plotting head, means supporting said plotting head for movement transversely and longitudinally of said plotting board, independently operable means for moving said plotting head in transverse and longitudinal directions with respect to said plotting board including a pair of independently actuable power driven devices, individual electric control circuits for said pair of power driven devices including separate commutator-type switching means operable by the respective power driven devices, each of said switching means including a plurality of segmented rotary elements and each element having exactly ten conductive segments engageable one at a time by a conductive brush, means connecting said plurality of rotary elements and the respective brushes in parallel, a keyboard unit including normally closed manual switches and key actuators therefor numbered from 0 to 9 for each rotary element and with one switch connected in series with each segment of the rotary elements, a single preselected manual switch for each rotary element being movable to open position to cause an open circuit condition through the switching means when segments corresponding to the open switches are contacted by the associated brushes, and means to cause rotation of the rotary elements of each switching means at a ten to one speed ratio with respect to each other from driving to driven element, whereby selection of numbered key actuators on said keyboard unit before connection of a power source to said power driven devices through said electric control circuits will result in a predetermined degree of rotation of the rotary elements of each switching means concurrently with a predetermined traverse of said plotting head transversely and longitudinally of said plotting board before the open circuit condition of each switching means occurs and said electric control circuits are broken to cause said power driven devices to assume a non-operating condition with respect to the plotting head moving means and said commutator-type switching means.

10. A graph plotting machine comprising, means providing a plotting board and support therefor, a plotting head including a housing, a plurality of type elements in said housing mounted for movement toward and away from the center of said housing, means normally biasing said type elements away from the center of said housing, solenoid means for each type element to move the elements selectively into the center of said housing, electromagnetic means in said housing at the center thereof to engage the respective type elements when moved to the central position in said housing by said solenoid means, means supporting said plotting head for movement transversely and longitudinally of said plotting board, independently operable means for moving said plotting head in transverse and longitudinal directions with respect to said plotting board including a pair of independently actuable power driven devices, individual electric control circuits for said pair of power driven devices including separate rotary switch means operable by the respective power driven devices, means to maintain said power driven devices in driving operation with respect to said plotting head moving means until each of said rotary switch means has been rotated a predetermined extent, means including manual switches in series with said rotary switch means to break said electric control circuits when said rotary switch means have been rotated a predetermined extent corresponding to an open circuit condition through said manual switches and when said plotting head has been moved to a predetermined position on said plotting board, and means responsive to breaking of said control circuits simultaneously for actuating said electromagnetic means and thereby impressing one of said type elements onto said plotting board at said predetermined position of said plotting head on said plotting board.

11. A graph plotting machine comprising, means providing a plotting board and support therefor, a plotting head, means supporting said plotting head for movement transversely and longitudinally of said plotting board, independently operable means for moving said plotting head in transverse and longitudinal directions with respect to said plotting board including a pair of independently actuable power driven devices, individual electric control circuits for said pair of power driven devices including separate rotary switch means operable by the respective power driven devices, means to maintain said power driven devices in driving operation with respect to said plotting head moving means until each of said rotary switch means has been rotated a predetermined extent, means including manual switches in series with said rotary switch means to break said electric control circuits when said rotary switch means have been rotated a predetermined extent corresponding to an open circuit condition through said manual switches and when said plotting head has been moved to a predetermined position on said plotting board, a plurality of independently movable type elements mounted on said plotting head and individually selective for movement to a predetermined printing position with respect to said plotting head, and means including a solenoid responsive to breaking of said control circuits simultaneously for impressing a type element located in said predetermined printing position onto said plotting board.

12. A graph plotting machine comprising, means providing a plotting board and support therefor, a plotting head, means supporting said plotting head for movement transversely and longitudinally of said plotting board, independently operable means for moving said plotting head in transverse and longitudinal directions respectively on said plotting board including a pair of independently actuable power driven devices, means including a keyboard to preselect abscissa and ordinate displacements of said plotting head with respect to an arbitrary point of origin on said plotting board, means energized by said keyboard to cause said pair of power driven devices to move said plotting head to a point on said plotting board corresponding to said preselected abscissa and ordinate displacements, and means set in operation by said power driven devices to stop said plotting head when it reaches said point on said plotting board corresponding to said preselected abscissa and ordinate displacements.

13. A graph plotting machine comprising, a plotting board adapted to receive a sheet of graph plotting paper on one face side thereof, a plotting head, guide means supporting said plotting head for movement in transverse and longitudinal directions over said one face side of said plotting board with said directions being always in right angular relation, a pair of independently operable means for moving said plotting head in said transverse and longitudinal directions respectively, each of said independently operable means including a separate electric motor, means including a keyboard to preselect abscissa and ordinate displacements of said plotting head with respect to an arbitrary point of origin on said plotting paper, switch means energized by said keyboard to cause said electric motors to move said plotting head to a point on said plotting paper corresponding to said preselected abscissa and ordinate displacements, and means set in operation by said electric motors to break the electric circuits to said electric motors when said plotting head reaches said point on said plotting paper corresponding to said preselected abscissa and ordinate displacements.

14. A graph plotting machine comprising, a plotting board adapted to receive a sheet of graph plotting paper on one face side thereof, a plotting head, guide means supporting said plotting head for movement in transverse and longitudinal directions over said one face side of said plotting board with said directions being always in right angular relation, a pair of independently operable means for moving said plotting head in said transverse and longitudinal directions respectively including independently actuable power driven devices, manually operable means to preselect abscissa and ordinate displacements of said plotting head with respect to an arbitrary point of origin on said plotting paper, means energized by said manually operable means to cause said power driven devices to move said plotting head to a point on said plotting paper corresponding to said preselected abscissa and ordinate displacements, and means set in operation by said power driven devices to stop said plotting head when it reaches said point on said plotting paper corresponding to said preselected abscissa and ordinate displacements.

DON W. YOUNG.
JOHN B. TRENHOLM, Jr.

References Cited in the file of this patent

UNITED STATES PATENTS

| Number | Name | Date |
| --- | --- | --- |
| 1,780,674 | Ewald | Nov. 4, 1930 |
| 2,054,127 | Johnson et al. | Sept. 15, 1936 |
| 2,076,198 | Honnolke | Apr. 6, 1937 |
| 2,130,229 | Close et al. | Sept. 13, 1938 |
| 2,165,278 | Kolm | July 11, 1939 |
| 2,278,409 | Armbruster | Apr. 7, 1942 |